United States Patent Office 2,955,121
Patented Oct. 4, 1960

2,955,121

POLYMERIZATION OF UNSATURATED FATTY ACIDS

Latimer D. Myers and Charles G. Goebel, Cincinnati, and Fred O. Barrett, Glendale, Ohio, assignors to Emery Industries, Inc., Cincinnati, Ohio, a corporation of Ohio No Drawing. Filed Aug. 24, 1959, Ser. No. 835,430

11 Claims. (Cl. 260—407)

This invention relates to a method of manufacturing polymeric acids from unsaturated fatty acids which may be monounsaturated or polyunsaturated or a mixture of the two. Examples of monounsaturated fatty acids which may be used in this process are oleic acid and erucic acid. Examples of polyunsaturated fatty acids which may be used in this process are linoleic acid, linolenic acid and fish oil fatty acids. In general, these fatty acids are the unsaturated monocarboxylic fatty acids which occur in nature usually in the form of glycerides and which have chain lengths of 16–22 carbon atoms. Processes of polymerization of these fatty acids are disclosed in Patents Nos. 2,793,219 and 2,793,220. Patent No. 2,793,219 discloses the process of polymerizing monounsaturated fatty acids, and Patent No. 2,793,220 discloses the process of polymerizing polyunsaturated fatty acids. The actual steps of the processes are essentially the same in each patent, but the end products are different, due to the difference in the starting materials.

As disclosed in these patents, the fatty acids are heated in the presence of crystalline clay mineral and water at a temperature of substantially 180–260° C. for a period of several hours, the exact time depending upon the temperature used and upon the result desired. The patents disclose that the clay mineral may be used in amounts varying from 1–20 percent of the weight of the fatty acids being treated, 2–6 percent being a practical operating range. According to the disclosure of these patents the amount of water should be substantially 1–5 percent of the weight of the fatty acids being treated, 2–4 percent being a practical operating range. The present invention is an improvement upon the processes disclosed in these two patents.

The business of manufacturing polymerized fatty acids for sale on the open market originated about fifteen years ago. Since that time, well over one hundred United States patents have been issued which disclose and claim various uses for these polymerized fatty acids. Thus, there has arisen a demand for polymerized acids of more specialized properties than was required when the industry was in its infancy.

One manner in which different samples of polymerized acids may differ from each other is in the ratio of trimeric acids to dimeric acids. In all cases, the trimeric acid is the minor component, and in general does not exceed 26 percent of the weight of the polymeric acids. In fact, 17–24 percent in the more normal range, depending upon the nature of the starting material and other factors hereinafter discussed. Nevertheless, the control of, and particularly the reduction of, the trimer content of the polymerized acids is of very great practical importance in specific industries in which the polymerized acids are used.

For instance, one of the primary uses of the polymerized fatty acids is for making linear polymers with bases such as ethylene diamine. If the content of trimeric acids is too high, then too many cross linkages form during the condensation, and unusable gels result. Theoretically, the best linear polymers would require the highest possible content of dimeric acids. The process of this invention is adapted to produce polymerized fatty acids having a relatively low trimer content in comparison with the polymerized fatty acids produced by the processes disclosed in the United States Patents Nos. 2,793,219 and 2,793,220.

The improvement over the processes of Patents Nos. 2,793,219 and 2,793,220 consists in the incorporation of small amounts of alkali in the reacting mixtures which are disclosed in the identified patents.

The alkali may be incorporated in the reacting mixture in any one of a number of ways: (1) as dry alkali mixed with the dry clay; (2) dissolved in the water added to the reacting materials; (3) as a soap of the fatty acid under treatment, or a soap of other fatty acids; or (4) as available alkali in the clay.

In any case, the vessel in which the reaction is conducted is charged with the fatty acids undergoing treatment with crystalline clay mineral which is preferably 3.0–6.0 percent of the weight of the fatty acids; with water which is preferably 1.0–2.0 percent of the weight of the fatty acids and with alkali which, as available alkali, is preferably 0.5–8.0 percent of the weight of the clay. The autoclave is then heated to a temperature of substantially 230–260° C. for a period of about three to four hours.

The clays which may be used in the practice of the process of this invention are the commercial, abundant, crystalline, surface active clay minerals, such as: montmorillonite, hectorite, halloysite, attapulgite, sepiolite. For instance, the commercial bentonites may be used if they contain sufficient montmorillonite. The bentonite clays containing at least 75 percent montmorillonite are particularly recommended.

Polymerization of the fatty acids commences at substantially 180° C. However, during the heating up period and before any substantial polymerization has commenced, the clay, fatty acids and alkali interreact and reach an equilibrium in respect to relative alkalinity and acidity. Thus, the polymerization reaction takes place after the alkali is distributed between the crystalline clay mineral and the fatty acids with which it forms soap.

Thus, the process of the present invention is a two-stage process involving two separate sets of chemical reactions, whereas the processes of the hereinbefore identified patents were one-stage processes which involved only one set of chemical reactions. In the process of this invention, chemical reaction takes place during the heating up period between and among the various components of the mixture; namely, the fatty acids, the clay and the alkali. This is the first stage of the process, and may be said to produce a modified or a compound catalyst. After the equilibrium of this chemical reaction is reached and after the temperature of substantially 180° C. is attained, the second stage of the process commences, namely, the polymerization.

Although the amount of alkali included in the reacting mixture is very trifling in comparison with the amount of fatty acids present, the effect of this minor alkaline component is very tangible and valuable. In the first place, it reduces the ratio of trimeric to dimeric acids below what the ratio would be if the alkali were not included. In the sceond place, the presence of the minor alkaline component very much improves the quality of the monomeric by-product or co-product which usually amounts to 40–50 percent of the fatty acids being treated.

In the absence of an alkaline reacting component the monomeric co-product is relatively high in unsaponifiables and lactones. It also has a comparatively low I.V. and is difficult to hydrogenate. If the minor alkaline reacting component is included in the reacting mixture, the free fatty acid content of the monomer is increased, the iodine value is higher and the monomer is more easily hydrogenated.

The available alkali may be any one of the hydroxides or alkaline reacting salts of the alkali and alkaline earth metals. For example, the water soluble alkalis sodium hydroxide, potassium hydroxide and barium hydroxide as well as the slightly water soluble alkalis such as calcium and magnesium hydroxides are suitable for use in this invention. The quantity of alkali incorporated in the reacting mixture may be 0.5–8.0 percent hydroxide, based on the weight of the clay used in the treatment or its equivalent in alkaline reacting salts. All alkalis exert an individual and specific influence on the reaction. For example, approximately twice as much calcium hydroxide is necessary to provide the same effect as sodium hydroxide. In general, on the basis of chemical equivalency water soluble alkalis are more effective than the less soluble alkalis. It follows that if sodium or potassium hydroxides are used or equivalent amounts of alkali metal salts are used, maximum effectiveness is attained with quantities not exceeding 4.0 percent. On the other hand, if less water soluble alkaline earth compounds are used then the quantity employed should be greater to obtain equivalent results, best results being obtained in the upper portion of the specified percentage range. In all cases, the available alkali should be sufficient to result in the formation of at least a small amount of fatty acid soap. If a natural alkaline clay is used, then the clay should contain available reactive alkali amounting to at least 0.5 percent of its weight. Such a natural clay may be regarded as constituted by two components, a major component which does not react with the carboxyl group of fatty acids, and a minor component which does react with the carboxyl group of fatty acids.

The formation of the fatty acid soap in the practice of the process of this invention inherently incorporates in the polymerized acids a component which is undesirable in a low trimer content polymer intended for making linear polymers. Hence, after polymerization is completed, the reaction products are acidulated with acids which form salts with the metals of the soaps, which salts are not soluble in the fatty acids, and may be removed from them with the clay by filtration. Various acids may be used, such as oxalic acid, citric acid, phosphoric acid, or even sulfuric acid, if the amount is carefully adjusted. The use of phosphoric acid is particularly recommended because it does not darken the polymerized acids or impair their color stability.

In summary, the process of this invention comprises heating a system which includes unsaturated fatty acids, a surface active crystalline clay mineral, available reactive alkali and water to a polymerization temperature whereby the fatty acids, the clay and the available alkali interreact chemically to provide a stable, modified or compound catalyst. Preferably, the temperature is further elevated and is held at the elevated temperature until the desired polymerization is completed. The time and temperature are interrelated; the lower the temperature, the longer the time, and vice versa. Pressure is maintained throughout the heating to retain a portion of the water in the fatty acid-catalyst system. The products of the reaction are then cooled; the soap is acidulated; and the clay and salts resulting from the acidulation are filtered from the fatty acids. The monomeric by-product or co-product is then removed by distillation, leaving the polymer as a still residue.

The process just described may be practiced on all fatty acids and mixtures of fatty acids which contain unsaturated fatty acids having chain lengths of 16–22 carbon atoms. Commercial oleic acid is used in the following examples as a typical monounsaturated fatty acid. Tall oil fatty acids are used in the following examples as typical mixtures of fatty acids which are high in polyunsaturated fatty acids. It is to be understood, however, that the process may also be practiced with tallow fatty acids, rapeseed oil fatty acids, cottonseed oil fatty acids, linseed oil fatty acids, corn oil fatty acids, soybean oil fatty acids, and fish oil fatty acids.

The amount of clay may be from 1–20 percent of the weight of the fatty acids, but as a matter of practical operating expediency should be substantially 2–6 percent. The amount of water is preferably 1–5 percent, but may be less if the free space in the vessel is kept to a minimum. In some cases, the water content of the clay itself may be sufficient to promote the reaction and prevent decarboxylation. The amount of water may therefore vary from a small amount, approximating 1 percent, up to 5 percent. A water content of 1–3 percent is considered practical and satisfactory. The amount of alkali should be 0.5–8.0 percent of the weight of the clay as explained, the amount being sufficient to form at least some fatty acid soap. The polymerization may be performed at temperatures which may be as low as 180° C. or as high as 270° C. The more practical temperature range is 200° C. to 260° C. If a tempearture in the range of 230–260° C., say 240° C. is used, a satisfactory polymerization occurs within about four hours. This temperature range is very practical for commercial operations and produces a very satisfactory polymer.

By gradation in the amount of available alkali used in the reaction, controlled variations in the previously discussed properties of the polymeric and monomeric acids may be obtained. The following examples illustrate the practice of the process.

*Example 1*

A stirred autoclave was charged with 2400 grams of refined tall oil fatty acids, 96 grams of clay, 24 grams of water and 1 gram of sodium hydroxide. The clay was Grade 98 Filtrol sold by the Filtrol Corporation. The autoclave was heated to a temperature of 240° C. and held at that temperature for a period of four hours under a steam pressure of 135 lbs./in.$^2$. The reaction mixture was then cooled down to 180° C. and 6 grams of a solution of 75 percent phosphoric acid diluted with 20 cc. of water were added. The mixture was stirred under pressure for a period of 30 minutes, then discharged and filtered. (Equivalent amounts of oxalic, citric, sulfuric or other acids may be used in place of the phosphoric acid.) The monomer, amounting to substantially 40 percent, was then distilled off up to a temperature of 270° C. under 3 mm. pressure. In order to determine the content of trimeric acids in the polymeric acids, the polymeric acids were converted to methyl esters and reduced to glycols by high-pressure hydrogenation. The dimeric glycols were distilled at a temperature of 360° C. under 2 mm. pressure leaving the trimeric glycols as still residue. By this technique, the percent of trimer present in the polymer was determined to be just under 16 percent.

The neutralization equivalent of the monomer was 320, the iodine value was 77 and the sum of unsaponifiable and lactones was 13.5 percent. A control example with the same materials and procedure except for the omission of sodium hydroxide and the subsequent acidulation gave a yield of polymeric acids containing 20.5 percent trimeric acids. The monomer of the control example had a neutralization equivalent of 332, an iodine value of 70 and a content of unsaponifiable and lactones amounting to 17.7 percent.

*Example 2*

All of the steps of Example 1 were repeated with the very same materials except that 2 grams of sodium hydroxide were used. The polymeric acids had a trimeric acid content of 14.6 percent. The monomeric co-product, which in this case amounted to substantially 40 percent, had a neutralization equivalent of 304, an iodine value of 88 and a content of unsaponifiable and lactones amounting to only 7.8 percent. The difference between a polymer having a trimeric acid content of 14.6 percent and a polymer having a trimeric acid content of 20.5 percent (control example) is very significant from the point of view of making polyamide resins. The polymeric acids having the high trimeric acid content tend to form gels, whereas the polymeric acids of the lower trimeric acid content do not. Also, the decline in the percent of lactones and unsaponifiable present in the monomer from 17.7 percent (control example) to 7.8 percent, which amounts to a 56 percent decrease, is highly indicative of the improvement in the quality of the product.

*Example 3*

Oleic acid was reacted at 240° C. for 4 hours under a steam pressure of approximately 150 lbs./in.$^2$ using 4 percent of a natural clay containing approximately 1.7 percent of available alkali expressed as NaOH. Completing the process according to the steps given in Example 1 resulted in a polymeric acid residue containing 12 percent trimeric acid. The monomeric co-product obtained in 47 percent yield had a neutralization equivalent of 287, an iodine value of 61.8, and the sum of unsaponifiable and lactones was only 3.2 percent. A control polymerization run using the same reaction conditions and Grade 98 Filtrol gave substantially the same yield of polymeric acids which, however, contained trimeric acids amounting to 18 percent. The monomeric co-product had a neutralization equivalent of 300, an iodine value of 41.7, and the sum of unsaponifiable and lactones amounted to 7.9 percent.

*Example 4*

All of the steps of Example 1 were followed with the same materials except for the clay. In this case, Panther Creek is a naturally alkaline clay which is sold by American Colloid Company. (About the same result is obtained if Clay X–769 sold by Bennett-Clark Company is used.) Both of these clays contain sufficient available reacting alkali to permit the practice of the process of this invention. In this case, the total product was acidulated with 10.2 grams of anhydrous citric acid dissolved in 20 cc. of water. The trimeric content of the polymeric residue was 13 percent. The monomeric co-product showed substantially the same improvement disclosed by Example 2.

*Example 5*

The steps of Example 1 were followed with the same materials except that 4.7 grams of Ca(OH)$_2$ were used. The trimeric acid content of the polymeric acid residue was 14.7 percent. The monomeric co-product obtained in 38 percent yield had an I.V.=93, a neutralization equivalent of 310, and the sum of unsaponifiable and lactones was 9.9 percent. Similar results were obtained by the incorporation of Ba(OH)$_2$ and Mg(OH)$_2$ in appropriate amounts with the catalyst.

The process of this invention may also be practiced as an improvement over the process of each of the examples of Patents Nos. 2,793,219 and 2,793,220. In all cases, sodium hydroxide, 3 percent of the weight of the clay for instance, may be added to the polymerization mixture of the example and in each case the trimeric acid content of the resulting polymer will be lower than the trimeric acid content obtained by following the exact example of the patent. However, when the alkali addition is used it is preferable to conduct the polymerization at a temperature of substantially 10° C. higher than the temperature which would be optimum if the alkali addition were not made. By this temperature increase, the yields of polymer obtained by the process of this invention may be made to approximate or equal the yields of polymer of the examples of the specified patents. Any slight difference in yields is more than compensated for by the improved quality of the polymer and by the improved quality of the monomeric co-product.

From the point of view of providing improved polybasic acids suitable for use in the resin industry, and particularly from the point of view of providing polymerized fatty acids particularly suited for the formation of linear polymers, the trimeric acid content of the polymeric acid yield should not substantially exceed 15 percent. By the practice of the process of this invention, such polymeric acids may be obtained from a great variety of starting materials including tall oil fatty acids, which are relatively inexpensive and oleic acid which is a very common and readily available commodity of commerce.

Tall oil fatty acids are representative of available fatty acids having a relatively high polyunsaturated fatty acid content and oleic acid is representative of available fatty acids having a relatively low polyunsaturated fatty acid content. In either case, the process of this invention may be used to obtain polymeric yields in the range of 50–65 percent, the exact yield depending upon the duration of the treatment, the temperature employed, the activity of the clay and the susceptibility of the starting material to polymerization.

The advantage of carrying out the polymerization in the presence of alkali is two-fold: (1) the trimeric acid content of the polymer is decreased and (2) the free fatty acid value of the monomer is also increased and the monomer is a more valuable and readily salable product.

Having described our invention, we claim:

1. In a process wherein polymerization of unsaturated fatty acids is effected by heating said acids in the continuing presence of minor proportions of surface-active crystalline clay mineral and of water, the improvement which comprises incorporating in the reaction mixture a catalytic amount of an alkali material capable of reacting in some measure with the fatty acids in the mixture to form soap.

2. The method of claim 1 wherein the alkali material comprises at least one compound selected from the group consisting of the hydroxides and the alkaline reacting salts of the alkali and alkaline earth metals.

3. The method of claim 1 wherein at least a portion of the alkali material is supplied by incorporating in the reaction mixture an alkaline type of surface-active, crystalline clay mineral containing reactive alkali.

4. In a process wherein polymerization of unsaturated fatty acids is effected by heating said acids in the continuing presence of minor proportions of surface-active, crystalline clay mineral and of water, the improvement which comprises incorporating in the reaction mixture a catalytic amount of a soap of a fatty acid and an alkali metal.

5. The process of claim 4 wherein the soap is added in an amount of from about 0.5 to 8%, said percentage being based on the weight of clay mineral present and expressed in terms of the hydroxide of the alkali metal component of said soap.

6. In a process wherein polymerization of unsaturated fatty acids is effected by heating said acids in the continuing presence of minor proportions of surface-active, crystalline clay mineral and of water, the improvement which comprises incorporating in the reaction mixture a catalytic amount of a soap of a fatty acid and an alkaline earth metal.

7. The process of claim 6 wherein the soap is added in an amount of from 0.5 to 8%, said percentage being based on the weight of clay mineral present and expressed in terms of the hydroxide of the alkaline earth metal component of said soap.

8. The process of polymerizing unsaturated fatty acids which comprises heating at temperatures of from about 180 to 270° C., under elevated conditions of pressure, a reaction mixture comprising unsaturated fatty acids, a minor proportion of a surface-active, crystalline clay mineral, a minor proportion of water and a catalytic amount of a soap of a fatty acid and an alkali metal, said heating being continued for a period sufficient to effect an appreciable polymerization of the fatty acids; acidulating the polymerized reaction mixture with an acid adapted to convert soap present therein to free acid and a substantially fatty acid-insoluble salt; and removing clay mineral and salt from the acidulated mixture.

9. The process of polymerizing unsaturated fatty acids which comprises heating at temperatures of from about 180 to 270° C., under elevated conditions of pressure, a reaction mixture comprising unsaturated fatty acids, a minor proportion of a surface-active, crystalline clay mineral, a minor proportion of water and a catalytic amount of a soap of a fatty acid and an alkaline earth metal, said heating being continued for a period sufficient to effect an appreciable polymerization of the fatty acids; acidulating the polymerized reaction mixture with an acid adapted to convert soap present therein to free acid and a substantially fatty acid-insoluble salt; and removing clay mineral and salt from the acidulated mixture.

10. The process of polymerizing unsaturated fatty acids which comprises heating at temperatures of from about 180 to 270° C., and in the continuing presence of water, a reaction mixture comprising unsaturated fatty acids and a minor proportion of a surface-active, crystalline clay mineral of the alkaline type, said clay containing an alkali component capable of reacting in some measure with the fatty acids in the mixture under the reaction conditions prevailing therein to form a catalytic amount of soap, said heating being continued for a period sufficient to effect an appreciable polymerization of the fatty acids; acidulating the polymerized reaction mixture with an acid adapted to convert soap present therein to free acid and a substantially fatty acid-insoluble salt; and removing clay mineral and salt from the acidulated mixture.

11. The process of polymerizing unsaturated fatty acids which comprises heating at temperature of from about 180 to 270° C., and in the continuing presence of water, a reaction mixture comprising unsaturated fatty acids and a minor proportion of a surface-active, crystalline clay mineral of the alkaline type, said clay containing from 0.5 to 8% by weight of an alkali component capable of reacting in some measure with the fatty acids in the mixture under the reaction conditions prevailing therein to form soap, said heating being continued for a period sufficient to effect an appreciable polymerization of the fatty acids; acidulating the polymerized reaction mixture with an acid adapted to convert soap present therein to free acid and a substantially fatty acid-insoluble salt; and removing clay mineral and salt from the acidulated mixture.

References Cited in the file of this patent

UNITED STATES PATENTS

| | | |
|---|---|---|
| 1,481,845 | Lund et al. | Jan. 29, 1924 |
| 2,341,239 | Percy et al. | Feb. 8, 1944 |
| 2,347,562 | Johnson | Apr. 25, 1944 |
| 2,793,219 | Barrett et al. | May 21, 1957 |
| 2,812,342 | Peters | Nov. 5, 1957 |

UNITED STATES PATENT OFFICE
CERTIFICATION OF CORRECTION

Patent No. 2,955,121                      October 4, 1960

Latimer D. Myers et al.

It is hereby certified that error appears in the above numbered patent requiring correction and that the said Letters Patent should read as corrected below.

Column 5, line 35, after "case," insert -- Panther Creek clay was used. --.

Signed and sealed this 13th day of June 1961.

(SEAL)
Attest:

ERNEST W. SWIDER                      DAVID L. LADD
Attesting Officer                      Commissioner of Patents